United States Patent [19]

Tharmaratnam et al.

[11] 3,855,424

[45] Dec. 17, 1974

[54] INFORMATION PROCESSOR FOR CHANGING TEMPO OF PLAYBACK FROM THE RECORDED TEMPO

[75] Inventors: Poothathamby Tharmaratnam, Mollenhutsfweg; Johannes Meijer Cluwen, Emmasingel, both of Netherlands

[73] Assignee: U.S. Philips Corporation, New York, N.Y.

[22] Filed: Jan. 30, 1973

[21] Appl. No.: 328,019

[30] Foreign Application Priority Data

Feb. 15, 1972 Netherlands ........................ 72/1920

[52] U.S. Cl. ........................ 179/15.55 T, 340/173 R

[51] Int. Cl. ........................ H04b 1/66, G11b 15/20

[58] Field of Search .... 179/15.55 T, 15.55 R, 1 SA; 178/DIG. 3

[56] References Cited

UNITED STATES PATENTS

| | | | |
|---|---|---|---|
| 3,104,284 | 9/1963 | French | 179/15.55 R |
| 3,293,613 | 12/1966 | Gabor | 340/172.5 |
| 3,467,783 | 9/1969 | Magnuski | 179/15.55 R |
| 3,499,996 | 3/1970 | Klayman | 179/15.55 R |
| 3,621,150 | 11/1971 | Pappas | 179/1 SA |
| 3,634,625 | 1/1972 | Geohegan | 179/1 SA |
| 3,681,756 | 8/1972 | Burkhard | 179/1 SA |

OTHER PUBLICATIONS

Stover, Time-Domain Bandwidth-Compression System, J.A.S.A., Vol. 42, 1967, p. 348–359.

Sharf, Intelligibility of Reiterated Speech, J.A.S.A., Vol. 31, 1959, p. 423–427.

*Primary Examiner*—Kathleen H. Claffy
*Assistant Examiner*—E. Matt Kemeny
*Attorney, Agent, or Firm*—Frank R. Trifari

[57] ABSTRACT

Accelerated or retarded signal playback is accomplished by writing the information alternately into one shift register at one clock frequency and reading out from the other shift register at another clock frequency. Feedback from a selectable last stage "main" output or from an "auxiliary" output intermediate stage of a shift register permits repetition of differing portions of the signal segment, to provide improved quality of reproduction for burst signals such as plosive sounds in speech.

8 Claims, 8 Drawing Figures

INFORMATION PROCESSOR FOR CHANGING TEMPO OF PLAYBACK FROM THE RECORDED TEMPO

BACKGROUND OF INVENTION

The invention relates to a circuit arrangement for playing back recorded information in a tempo which is different from the original recording tempo, in particular for retarded or accelerated playback of speech while retaining the correct pitch. As a rule, this information is derived from a magnetic tape recording, (in principle a gramophone record also may be used) which according to whether retarded or accelerated playback is desired, is played back at a speed which is lower or higher than that used during recording. Means are provided to restore the pitch to the correct value.

A known circuit arrangement of this kind is described in U.S. Pat. No. 3,541,264. In this known arrangement, the information is applied to the input of a delay line having a plurality of taps, each of which are connected via an electronic switch to a combining device. By connecting the electronic switches as a shift register, so that successively each switch becomes conducting, a similar effect is obtained as if a tape recorder having rotating playback heads were used. The difference in speed between the tape and a playback head - in analogy with the difference between the speed at which the information propagates along the delay line and that at which the electronic switches are successively operated - corresponds to the original recording speed of the tape.

Because of the large number of electronic switches required, this known apparatus will normally be in the form of an integrated circuit. The delay line takes the form of an analog shift register (alternatively a digital shift register may be used, which is preceded by an analog digital converter, and is succeeded by a digital analog converter) in which under the influence of clock pulses at a given frequency, the information is advanced one step at each clock pulse. Known (analog) shift registers of this type which operate as delay lines are, for example, the bucket-brigade storage circuits, the "charged coupled devices," and the "surface charge technology" devices described in the literature. A common feature of all these shift registers, is that they contain a large number of transistor structures which are connected as electronic switches. These are controlled by the clock pulses so that, viewed spatially, the information is shifted from the input to the output.

If the electronic switches connected to the taps described in the aforementioned United States Patent are to be included in the integrated circuit, however, it is not sufficient to provide a number of switching transistors equal to that of the taps, but an additional control mechanism is required to connect the electronic switches in the form of a ring counter (the frequency of which must be different from the clock frequency at which the analog shift register is controlled). This in turn requires an equal number of isolating transistors to prevent an undesirable reaction upon the analog shift register.

SUMMARY OF INVENTION

It is an object of the present invention to provide for the problem described, a considerably simpler solution which is suitable for integration. The invention is characterized in that the information in the desired tempo is alternately applied to a first and to a second shift register via a first electronic switch. The output signal is alternately derived from the second and the first shift register, respectively, via a second electronic switch (which consequently is operated in phase opposition to the first electronic switch). The clock pulses for shifting information through the shift registers are alternately, but in phase opposition, applied to either shift register via a third and a fourth electronic switch. These pulses jump from one frequency to the other at each change-over of the electronic switches, the ratio between the said frequencies preferably being equal to the ratio between the speed at which the information is applied to the shift registers and that at which it was recorded. Fifth and sixth electronic switches connect the outputs of the shift registers to the associated inputs.

In principle, the invention may be used not only for audio signals but also for video signals in a video recorder, for example, for repetitive playback of a given information track. However, in general, there will be simpler methods of repetitive playback of a video signal, for example by the use of a fixedly adjusted delay line, or of a second magnetic head which senses the signal on the tape with a given amount of lag relative to the first magnetic head. This is possible, because when playing back video signals, the required delays are considerably shorter than when playing back speech signals, in which delays of the order of 20 ms must be taken into account.

The inventive of the circuit arrangement electronically processes information supplied by a magnetic tape, gramophone record, or sound-film (which according to desired retarded or accelerated reproduction is played back at a speed which is lower or higher, respectively, than that used during recording). The information is reproduced at a speed which corresponds to the recording speed, with the result that the pitch is restored to the correct value. For obtaining given timbre effects, the same steps may obviously be used, while employing a ratio between the clock frequencies different from that between the recording and playback speeds. The circuit arrangement described permits the use of arbitrary values of the accelerating or retarding factors used in playing back the information, although the intelligibility (perception) deteriorates with increasing values of these factors.

When music is played back in a tempo different from the original recording tempo, particular attention is to be paid to improvements of the fidelity of reproduction, as will be set out hereinafter.

BRIEF DESCRIPTION OF DRAWINGS

Embodiments of the invention will now be described, by way of example, with reference to the accompanying diagrammatic drawings, in which.

DESCRIPTION OF PREFERRED EMBODIMENTS

Figures 1, 1A:
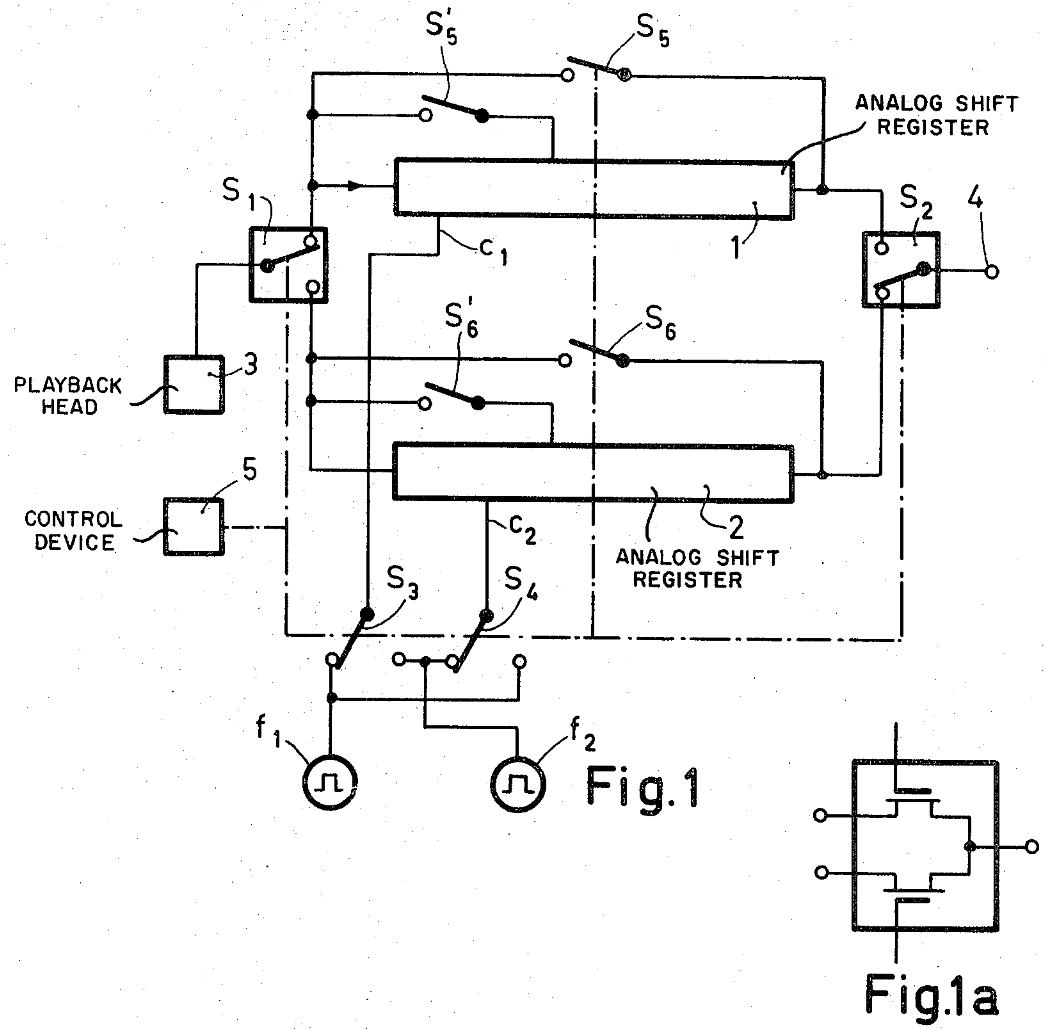
FIG. 1 is a circuit diagram showing schematically the basic elements of the circuit arrangement according to the invention.
FIGS. 1*a*, 1*b* and 4*a* show modified embodiments of parts of the circuit shown in FIGS. 1 and 4, respectively

The circuit arrangement shown in FIG. 1 comprises a first analog shift register 1 and a second analog shift register 2. The inputs of these shift registers 1 and 2 are connected via an electronic switch $S_1$ to the playback head 3 of a magnetic tape recorder. For retarded playback this tape recorder is operated at a speed lower than that used during recording, and for accelerated playback it is operated at a speed higher than that used during recording. The switch $S_1$ applies the signal from the head 3 alternately to the shift register 1 and to the shift register 2. In principle, such a switch comprises pair of transistors (for example bipolar transistors or MOS transistors) which are alternately rendered conductive and non-conductive, so that the head 3 is alternately connected to the shift register 1 and to the shift register 2.

Similarly, the outputs of the shift registers 1 and 2 are connected to an output terminal via an electronic switch $S_2$. The electronic switch $S_2$ is operated in phase opposition to the electronic switch $S_1$, i.e., when $S_1$ connects the head 3 to the input of the shift register 1, $S_2$ connects the output of the shift register 2 to the output terminal 4, and vice versa.

The shift registers 1 and 2 have inputs $c_1$ and $c_2$, respectively, for clock pulses, each clock pulse advancing the signal one step in the shift register.
If, for example, a bucket-brigade store, as described in co-pending Patent application Ser. No. 173,249, the information which is produced at the capacitors $C_o$ to $C_n$ is advanced one step at each clock pulse from the source $S_o$ described therein.

The clock inputs $c_1$ and $c_2$ are connected to clock pulse sources $f_1$ and $f_2$, respectively, via electronic switches $S_3$ and $S_4$, respectively. For retarded speech playback, the frequency of the source $f_1$ is lower than that of the source $f_2$, but for accelerated playback the converse holds. The shift registers 1 and 2 and the electronic switches shown may be designed as one integrated circuit. The sources $f_1$ and $f_2$, however, in general cannot readily be manufactured in integrated circuit form owing to their low frequencies (of, for example, from 10 kHz to 50 kHz). Hence it is advantageous for the pulse train of one source, to be derived by means of frequency dividers or frequency multipliers from that of the other source, or for both pulse trains to be derived from a common source. The ensures that the ratio between the frequencies of the sources $f_1$ and $f_2$ remains accurately constant, in that it is solely determined by the dividing or multiplying factors of the frequency dividers or frequency multipliers, respectively. The ratio between the frequencies of the sources $f_1$ and $f_2$ is made equal to the ratio between the playback speed and the recording speed of the tape.

In the case of accelerated speech playback, the information from the head 3 is written into the shift register 1 at a clock frequency $f_1$. This writing is continued until the shift register 1 is entirely full and even for some time thereafter, so that (inevitably) information is lost. Then, all the switches $S_1$ to $S_4$ are changed over, so that the output of the shift register 1 is connected to the output terminal 4 via the switch $S_2$, and is read out at the clock frequency $f_2$. Simultaneously, information from the head 3 is applied to the input of the shift register 2 into which it is written, at the clock frequency $f_1$. Owing to the aforementioned ratio between the clock frequencies $f_1$ and $f_2$, the signal at the output terminal 4 will be played back at the correct pitch, although part of the input information is omitted and playback is effected in an accelerated tempo. This omission of information, however, is unobjectionable, provided that the omitted part is short enough, for example shorter than 20 ms.

The shift register 1 is read out until it is entirely, or almost entirely, empty. If this shift register is a bucket-brigade store comprising $n$ capacitors, the time required to read this store will be equal to $n/f_2$. For this purpose, the electronic switches $S_1$ to $S_4$ are connected to a control device 5, which at intervals of $n/f_2$ seconds changes over the electronic switches. The pulse train from the source 5 may be derived from that from the source $f_2$ by means of frequency dividers. However, because the aforementioned interval is not very critical, if desired a separate oscillator may be used.

In the case of delayed speech playback, the frequency $f_1$ is made lower than the frequency $f_2$, as has been mentioned hereinbefore. The change-over time at which the switches $S_1$ to $S_4$ now are operated is made equal to $n/f_1$, so that the shift register 1 is entirely full just before reading commences. If, however, no further precautions were taken, this reading would only require a time of $n/f_2$, so that during the difference between the two times, a gap would occur in the output signal. This may be obviated by writing the output signal from the shift register 1 at the frequency $f_1$, into the shift register 2 also. Alternatively, an auxiliary delay device may be used which fills up the temporary absence of information. According to the invention, a particularly simple solution consists in the provision of electronic switches $S_5$ and $S_6$. During read-out of the shift registers, the latter electronic switches establish a connection between the output and the input of the associated shift register, so that the signal which is applied to the output terminal 4 via the switch $S_2$ is also written (if required, after amplification) into the respective input again. Thus reading out may indefinitely be continued, until the shift register into which information is to be written is entirely full with the new information.

If required, signal degradation is avoided, for example by the addition of amplifiers, by restoring the signal to direct-voltage and alternating-voltage levels equal to those at which it enters the shift registers. In particular, the direct-voltage level at the output is found to vary greatly with the clock frequency used, being higher at higher clock frequencies than at lower clock frequencies. This disadvantage may be avoided by connecting isolating capacitors in series with the switches $S_5$ and $S_6$ respectively, and/or by building the shift registers 1 and 2 each from two equal parts interconnected by an inverter stage so that the direct-voltage shift in one stage is compensated for by that in the other stage.

It has been found in practice, that a retardation or acceleration by a factor of more than 2 is seldom required. In the case of accelerated playback, a factor of 2 has the results that every second one of equal signal fragments reaches the output, and hence is reproduced. At smaller values of the acceleration factor, a larger signal fragment will be alternately reproduced without a smaller signal fragment, so that perception will only be improved.

Surprisingly, it has been found that such behavior is not obtained when a retarding factor of less than 2 is used. If, for example, a retarding factor of only 1.25 is used, first a signal fragment which corresponds to the information stored in the shift register to be read will reach the output, to be immediately followed by 25 percent of this signal fragment which, via the fifth or sixth switch, has been supplemented from the output of the respective shift register to its input. Thereupon, the first to fourth switches are operated, and the two shift registers interchange their functions. Even this 25 percent of supplemented signal may give rise to disturbances under certain circumstances.

As a rule, speech sounds have an average duration of 150 ms. The shortest speech sounds, the plosives, such as *k*, *p* and *t* have a duration of at most 80 ms. When the said switches are operated at intervals of 30 ms, so that the signal fragments also are 30 ms long, this time is long enough to prevent the undesired switching frequency (i.e. 33Hz) from being heard. This interval is also long enough for most sounds to add to an arbitrary signal fragment of 24 ms, a supplementary fragment of 6 ms, without the intelligibility being seriously impaired. For the said plosives, however, this does not always hold. When the signal fragment (of 24 ms) just encloses the part in which such a plosive decays (or rises), this decaying part will be reproduced for 24 ms and be immediately followed (for 6 ms) by a signal part which is supplemented via the fifth or sixth switch corresponding to the beginning of the said fragment of 24 ms. During this beginning, the signal has not yet commenced decaying. As a result, such a plosive will sound like a rolled *r*.

To obviate this effect, the fifth and sixth electronic switches may be connected to auxiliary outputs of the shift registers at which the signal information has not advanced as far in the respective register as at the (main) output to which the second electronic switch is connected.

Instead of, or in combination with, the electronic switches $S_5$ and $S_6$, electronic switches $S'_5$ and $S'_6$, respectively, are provided which connect the auxiliary outputs of the shift registers 1 and 2, respectively, to their inputs. The auxiliary outputs are located, for example, halfway along the shift registers 1 and 2 respectively, i.e., when such a shift register comprises *n* storage elements, the auxiliary output is connected to the ½ $n^{th}$ storage element, so that a signal applied to the input reaches this auxiliary output after ½*n* clock pulses. In the aforementioned numerical example of a retardation factor of 1.25, a signal fragment of 24 ms will again be followed by a signal part of 6 ms supplemented via the switch $S'_6$. However, this supplemented part now corresponds to the last (one third) part of the fragment of 24 ms, instead of to the first 6 ms part, so that the playback defect introduced is considerably smaller.

In theory, the defect introduced would be a minimum, if as the auxiliary output, that tap on the shift register is chosen at which the ratio corresponds to the fragment in the retardation factor desired. In the case of a retardation factor of 1.25, the auxiliary output would have to be located at one quarter of the shift register, i.e., at the ¼ $n^{th}$ storage element, so that the last part (6 ms) of the fragment of 24 ms is repeated and smoothly merges into the next signal fragment from the other shift register. For a retardation factor of 1.4 the auxiliary output would have to be located at the $0.4n^{th}$ storage element, and so on.

In general, a compromise will have to be made in which either one auxiliary output or a small number of auxiliary outputs are used. If one chooses to have just one auxiliary output, there is a certain preference for locating it at a tap 0.4 (the $0.4n^{th}$ storage element): For retardation factors of less than 1.4, the introduced defect is not excessively large; up to a retardation factor of 1.8, a signal portion is repeated twice, i.e., altogether played back thrice, however, apart from a small unnaturalness of reproduction, the intelligibility will hardly be impaired. For larger values of the retardation factor, the shift registers may be switched to the switches $S_5$ and $S_6$.

Figure 1B:
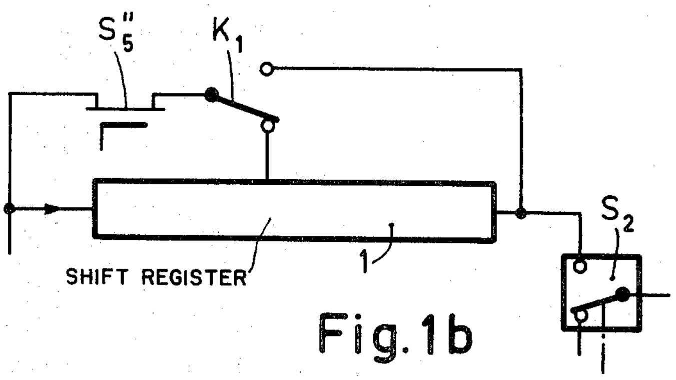

As is shown in FIG. 1*b*, this switch will usually be realized, because the two switches $S_5$ and $S'_5$ are combined to form a single electronically controlled switch $S''_5$. This switch on the one hand is connected to the input of the shift register 1, and on the other hand, via a change-over switch $K_1$, is connected either to the auxiliary output, (as shown) or to the main output (to which the switch $S_2$ also is connected) of the shift register 1.

The switch $K_1$ (and the corresponding switch, not shown, which replaces $S_6$ and $S'_6$) may be operated simultaneously with a selection switch for setting the desired factor of retardation (or acceleration). Obviously, $K_1$ may include further selection contacts which are connected to further auxiliary outputs of the shift register 1.

The control mechanism 5 may be in the form of a pulse source, the pulses from which are applied to the control electrodes of switching transistors which fulfill the functions of the electronic switches $S_1$ to $S_6$. A repetition frequency of the order of 30 Hz has been found satisfactory in practice. The pulses of the source 5 may be derived by means of a frequency divider. From the lower of the two frequencies $f_1$ and $f_2$, the factor of division is equal to the number of steps required to shift a signal from the input to the output of the shift register. This number of steps corresponds to the number of storage elements *n* (for example the number of storage capacitors in a bucket-brigade store) of such a shift register.

At the instant at which the electronic switches change over, the signal applied to the output 4 will generally not have the same phase as the previously applied signal, for the signal arrives at the output of either shift register in the form of fragments, each of which have a length of, for example, 30 ms. Hence, it will be purely accidental for the phase of the signal at the end of one fragment to be equal to that at the beginning of the next fragment. Consequently, the output signal at the terminal 4 may show abrupt jumps at a repetition frequency which corresponds to that of the control mechanism 5. It has been found that the ear is highly sensitive to these transition jumps, which it experiences as rattle disturbances. These disturbances may be suppressed by various means which may be used separately or in combination. For example, the output 4 may be connected to a pass filter which suppresses the switching frequency and the higher harmonics thereof. This step by itself does not provide sufficient effect, not only because a compromise is to be made with the suppression of the undesirable components while retaining the desired information, but also because the human ear continues to interpret the cross modulation terms between the switching frequency and the desired signal as the presence of the said switching-frequency rattle disturbance, even if the switching frequency itself is completely suppressed by the filter.

A better method is to cause the end of a signal fragment to gradually merge into the beginning of the new signal fragment by making the voltage applied to the switching transistors of the electronic switches $S_1$ to $S_6$, trapezoidal instead of rectangular. This ensures that one of the switching transistors is gradually switched off, when the other is switched on. Preferably, the inclined edge of the switching voltage should extend over at least 10 pulses from the clock frequency sources $f_1$ and $f_2$. If, for example, in the above embodiment having bucket-brigade stores 1 and 2 each of which comprise 260 stroage elements the lower of the two clock frequencies $f_1$ and $f_2$ is 10 kHz and the switching frequency of the control mechanism 5 is about 40 Hz (this means that the switching frequency may be derived from the frequency of 10 kHz by a cascade of eight frequency dividers-by-two and may also be used to feed the motor of the tape recorder). The inclined edge of the control voltage for the electronic switches $S_2$, $S_5$ and $S_6$ is preferably given a duration of, for example, from 1 to 2 ms, which corresponds to from 10 to 20 clock pulses.

Figure 2:
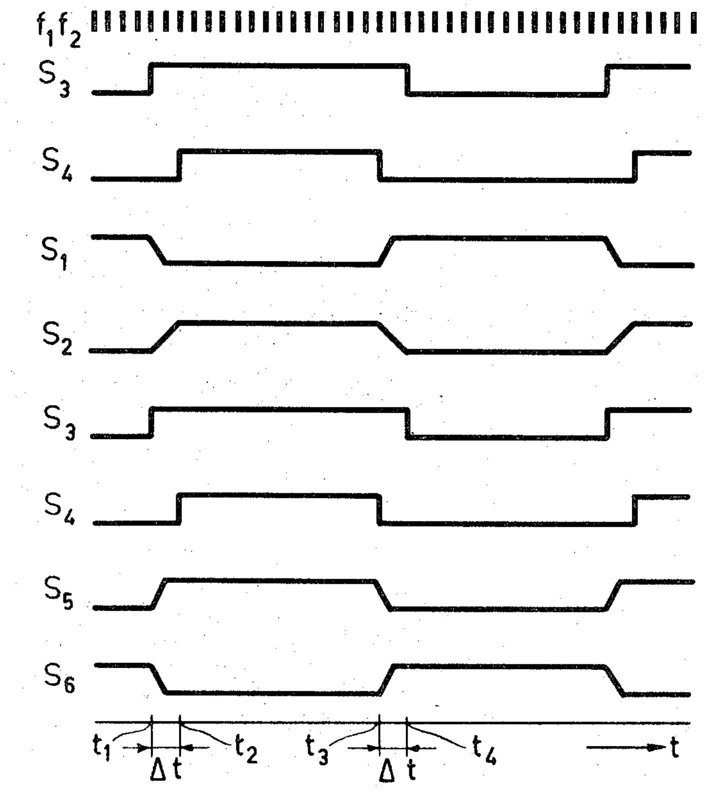
FIG. 2 shows schematically a pattern of waveforms of instruction pulses for controlling the circuit arrangement shown in FIG. 1.

FIG. 2 shows possible forms of the various control pulses for the electronic switches $S_1$ to $S_6$ as functions of time $t$. In particular, we have in mind electronic switches in the form of MOS transistors to which voltages of the forms shown in FIG. 2 are applied to the gate electrodes. In this event, the electronic switch $S_1$ to $S_4$ each comprise a pair of MOS transistors (FIG. 1*a*) which are rendered conductive and nonconductive in phase opposition by the control pulses.

At the top of FIG. 2, the clock pulses $f_1$ and $f_2$ are shown as functions of time. In the condition of the circuit arrangement shown in FIG. 1 the clock pulses $f_1$ are applied via the electronic switch $S_3$ to the analog shift register 1, and the clock pulses $f_2$ are applied via the electronic switch $S_4$ to the analog shift register 2; this condition corresponds to a low value of the voltages $S_3$ and $S_4$ of FIG. 2. At the instant $t_1$, at which the voltage $S_3$ in FIG. 2 becomes high, the connection of $c_1$ to $f_1$ in FIG. 1 is broken, and that of $c_1$ to $f_2$ is established. The control pulse $S_4$ of FIG. 2, which has to break the connection between $c_2$ and $f_2$ and make the connection between $c_2$ and $f_1$, lags by a period of $\Delta t$, so that during the interval between the instants $t_1$ and $t_2$, both shift registers are connected to the clock pulse source $f_2$. Within this interval $t_1 - t_2$, the control voltage $S_2$ gradually varies from a low value to a high value, i.e., the gate electrode voltage of one of the MOS transistors of which $S_2$ is composed, varies from a low value to a high value, whereas that of the other MOS transistor varies from a high value to a low value. As a result, the analog shift registers 1 and 2 are read in the correct rhythm, because they are controlled by the clock pulses $f_2$, and simultaneously the information from the shift register 2 gradually decays and that from the shift register 1 gradually rises. This gradual taking over of the information from one register by the other is favorably influenced by the use of MOS transistors - or in general, the use of isolated-gate field-effect transistors - since the main current paths (those between the source and drain electrodes) of these transistors act as variable resistors, and hence in the configuration shown, form a potentiometer having a variable division ratio.

For accelerated speech playback it is of no consequence whether the electronic switch is changed over abruptly or gradually, i.e., whether the control voltage $S_1$ in FIG. 2 abruptly jumps from a high value to a low value at the instant $t_1$. Hence, the electronic switches $S_5$ and $S_6$ may be dispensed with. However, if both accelerated and retarded speech playback are desired, it is preferable for the switch $S_5$ to be gradually operated, and the switch $S_1$ to be gradually changed over. This changeover must be effected much faster, for example, within 3 pulses from the sources $f_1$ and $f_2$, than the change-over of the electronic switch $S_2$ (for example in 10 clock pulses), because the supply of information from the source 3 to the input of the analog shift registers is written at a wrong speed, namely, at the frequency $f_2$, so that there is threat of a wrong pitch being formed. The short-time nature of the transition, and the use of similar potentiometer action of the switches $S_5$ and $S_1$, as described hereinbefore with respect to the electronic switch $S_2$ in FIG. 1*a*, ensures that this transition involves an almost imperceptible pitch change and at the same time is not so abrupt as to give rise to the perception of an undesirable rattle disturbance.

The further behavior of the voltage pulses shown in FIG. 2 will be obvious. The voltage $S_3$ jumps back to its low value, a period of $\Delta t$ later than does the voltage $S_4$, so that in the interval between $t_3$ and $t_4$, both shift registers 1 and 2 are read out at the clock frequency $f_2$. Owing to the inclined trailing edge of the control pulse $S_2$, a gradual transition of the output voltage from the shift register 1 to the shift register 2 is again obtained, causing this transient phenomenon to become nearly imperceptible. The various control pulses $S_1$ to $S_6$ of FIG. 2 may simply be derived from a single clock voltage generator, the inclined leading and trailing edges of the pulses $S_1$, $S_2$, $S_5$ and $S_6$ being obtainable by means of simple RC networks, for example by utilizing the capacitance between the gate and drain electrodes of a MOS transistor. The lag of the leading edge of $S_4$ relative to that of $S_3$, and the lag of the trailing edge of $S_3$ relative to that of $S_4$, may simply be derived from the voltage $S_2$, by applying the inclined edges of $S_2$ to a trigger circuit having a threshold voltage which is exceeded at exactly the desired instant, causing this trigger circuit to pass from one stable state to the other.

Figure 3:
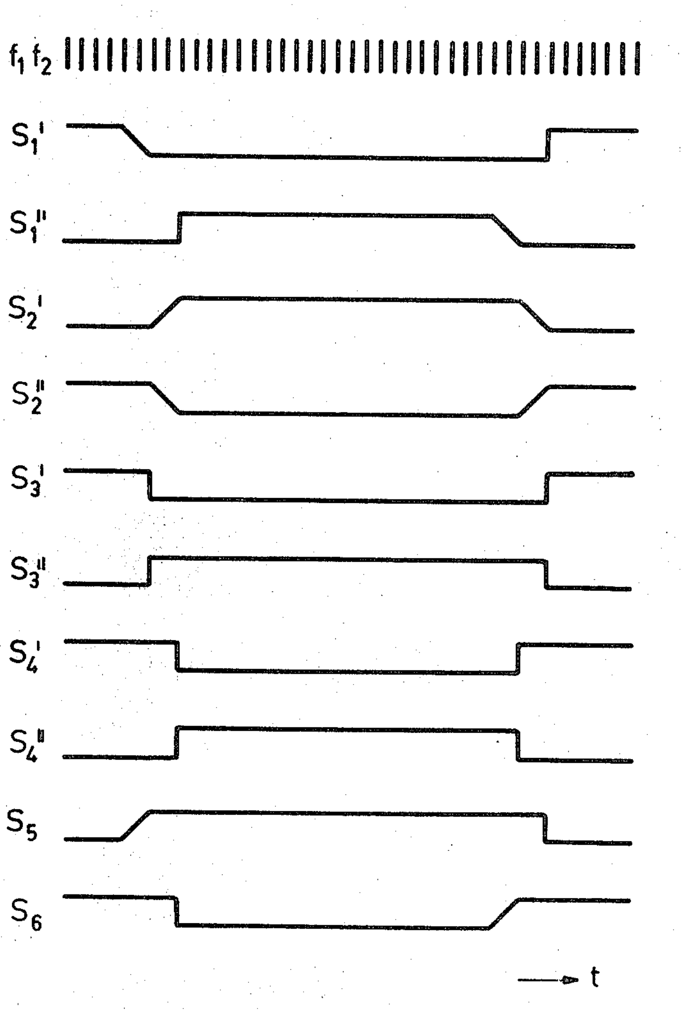
FIG. 3 shows a modification of the pattern of FIG. 2.

FIG. 3 shows a pattern of control pulses which slightly differs from that shown in FIG. 2, and which provides a greater degree of freedom in changing over the electronic switch $S_1$, and in switching on and off the electronic switches $S_5$ and $S_6$. As has been described hereinbefore with reference to FIG. 2, $S_1$ and $S_5$ must be changed over from one value to the other within a few pulses, because otherwise, a wrong pitch is written into the shift register. For this purpose, the electronic switches $S_1$ to $S_4$ are composed of separately controllable transistors, in the manner referred to hereinbefore. The high values of $S'_1$ and $S'_2$ are associated with the condition in which the connection to the upper contact of $S_1$ or $S_2$ respectively is made, whereas the low values relate to the condition in which this connection has been broken; the high values of $S''_1$ and $S''_2$ relate to the condition in which the connection to the lower contact of $S_1$ or $S_2$ is made, while the low values relate to the condition in which these connections have been broken. Similarly, $S'_3$ and $S'_4$ relate to the condition shown in which the connection to the left-hand contact is made, the high values of $S''_3$ and $S''_4$ relate to the condition in which the connection to the right-hand contact is made, while the low values always relate to the conditions in which the connections have been broken.

Starting from the condition shown in which information is written into the shift register 1 at the frequency $f_1$, first the control voltages for $S'_1$ and $S_5$ are gradually changed, one voltage from a high value to a low value, and the other voltage from a low value to a high value. Ultimately the condition is produced in which the connection between the signal ocsource 3 and the input of the shift register 1 is broken, while the connection of the output of the shift register 1 to its input is closed. These operations are performed at the write clock frequency $f_1$, because $S'_3$ maintains the connection between $f_1$ and $c_1$. Immediately on termination of the inclined edges of $S'_1$ and $S_5$, the switch $S'_3$ may be changed over, i.e., $S'_3$ drops to its low value and $S''_3$ rises to its high value. Subsequently, the process described with reference to FIG. 2 recommences, the switch $S_2$ being gradually changed over, i.e., $S''_2$ gradually falls off from its high value to its low value, and $S'_2$ gradually rises from its low value to its high value. The further control pattern will be obvious from FIG. 3, and it provides the advantage of slightly smoother transitions between the signal fragments which are fed back via the switches $S_5$ and $S_6$ to the inputs of the shift registers 1 and 2, respectively. This is similar to retarded signal playback. A disadvantage is that the removal of the transient phenomenon takes slightly more time, which involves a small loss of useful information.

Figure 4:
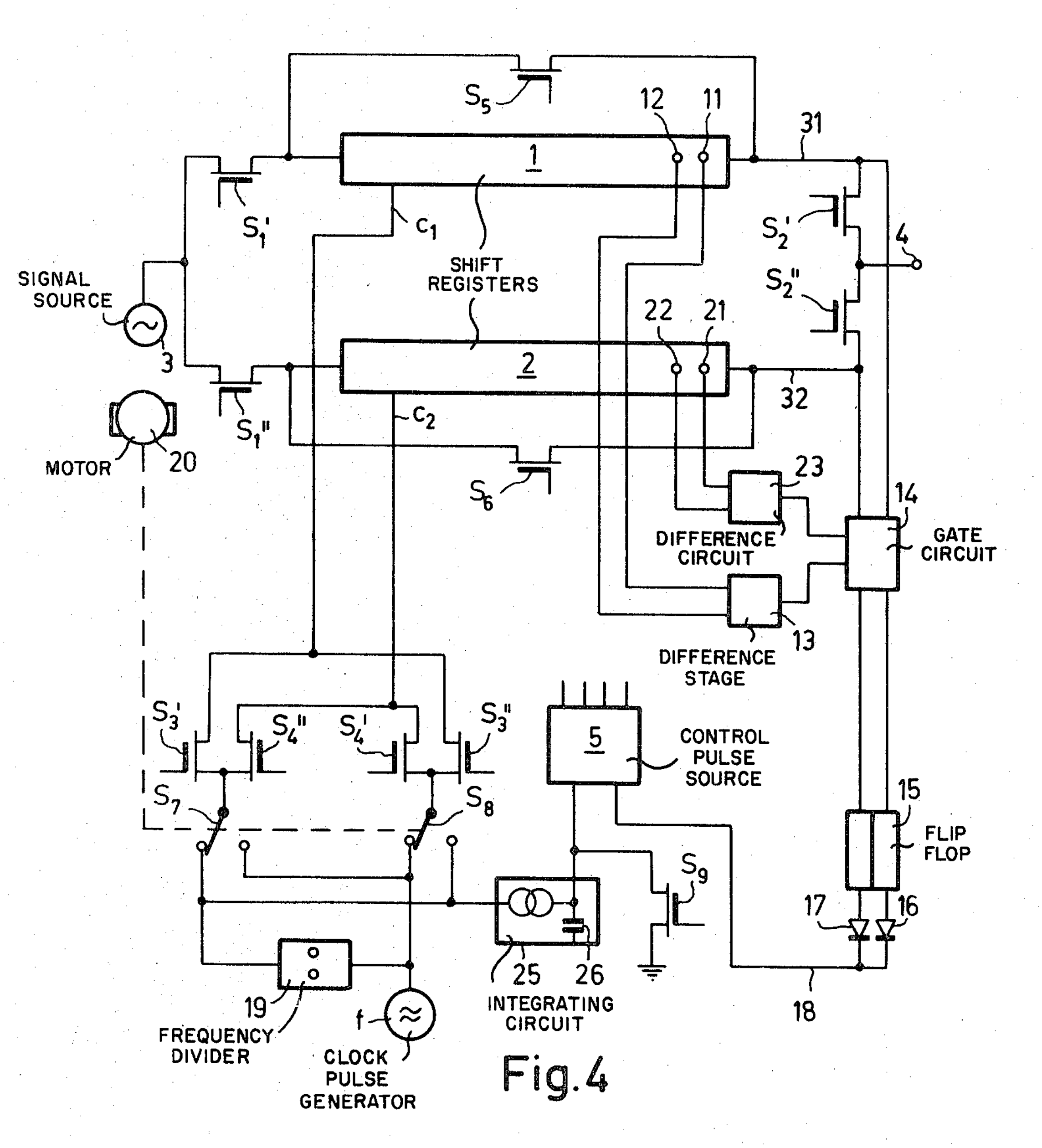
FIG. 4 shows a more elaborate circuit diagram.

Although the aforedescribed method of producing smooth transitions between signal fragments provides an appreciable improvement, it still gives rise to a transient phenomenon foreign to the ear. The very fact that these transient phenomena occur at regular intervals is annoying to the listener. The schematic circuit diagram of FIG. 4 illustrates a more elegant method of joining the fragments. In brief, the principle illustrated requires that the various electronic switches $S_1$ to $S_6$ are not changed over at fixed instants, but at instants which depend upon the instantaneous values of the two signal fragments to be joined, and upon the sign of the signal change. If at a given instant the said instantaneous values are equal and the signs of the changes of the signals also are equal, i.e., if both signals increase or both signals decrease, a change-over at the instant at which the said situation occurs will give rise to the least perceptible transient phenomena. If both applied signals are truly sinusoidal, the truth of this principle is obvious, because in this case a change-over is effected at the instants at which the phases of the two sinosides are exactly equal. With a complicated audio signal, which will normally be found in practice, it may be assumed that the signal fragments occur during periods which are so short that they are quasi-harmonic. In this case, also a change-over at the instant at which the aforementioned conditions are satisfied means that the phase of one signal corresponds to that of the other, so that the transition is scarcely perceptible.

In the first instance, FIG. 4 entirely corresponds to FIG. 1, except that all the electronic switches are shown in the form of controlled transistors (in particular controlled-gate field-effect transistors).

Figure 5:
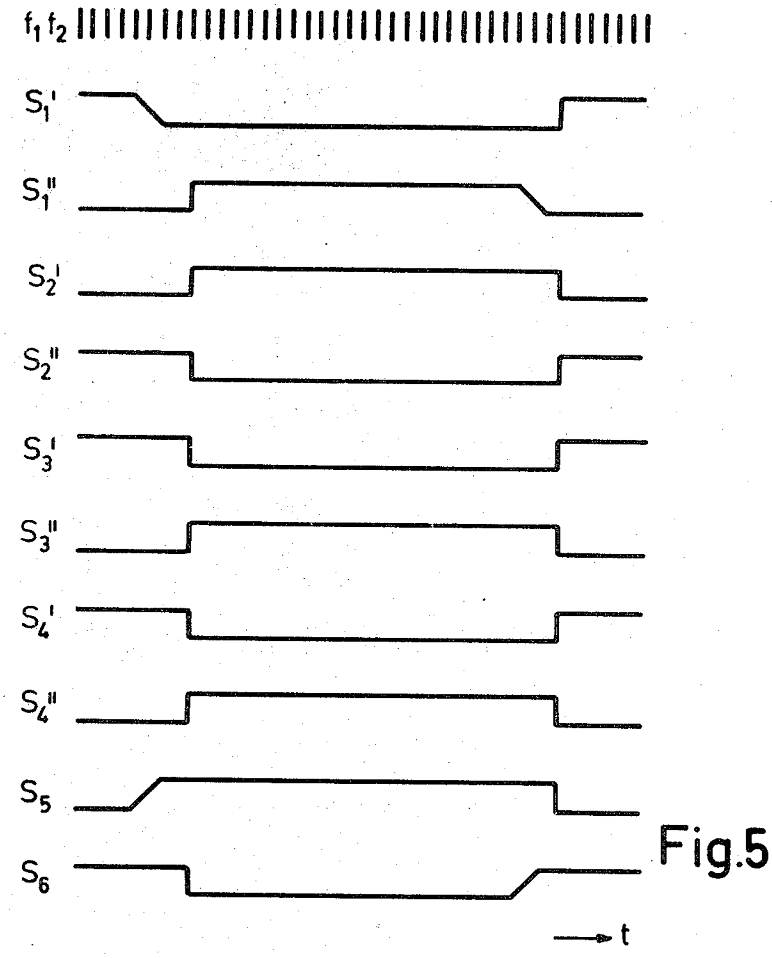
FIG. 5 shows the associated pattern of instruction pulses.

FIG. 5 shows the waveforms of the control voltages for the various electronic switches of FIG. 4. Similarly to what has been described with reference to FIG. 3, the cycle begins with $S'_1$ gradually falling to its low value, i.e., being switched off, and $S'_5$ being gradually energized, i.e., being switched on, at the write clock frequency ($S'_3$ switched on). Now the control pulse source 5 receives an instruction to cause the voltages $S''_1$, $S'_2$, $S''_2$, $S'_3$, $S''_3$, $S'_4$, $S''_4$ and $S_6$ to make abrupt jumps at the instant at which the output signal from the shift register 1 is equal to, and changes in the same sense as, the output signal from the shift register 2. Because during the time before this instant is reached the shift registers are controlled at different clock frequencies, the said output signals will relatively vary in different rhythms, so that the said instant is soon reached.

Thus, a perfectly smooth transition between the signal fragments is obtained which involves scarcely any time losses and consequently any information losses. In principle, as an alternative, the electronic switches $S_5$, $S'_1$ and $S_6$, $S'_2$ may be operated at the instant at which the signal at the output of the relevant shift register is just equal to, and varies in the same sense as, the signal at its input. However, accidental conditions may occur which may considerably delay this instant, for, again assuming a truly sinusoidal oscillation, its frequency may just be a subharmonic of the relevant clock frequency. Therefore, it is sheer chance whether the phase of the output signal from the shift register is equal to the phase of the signal at its input. In general, there will be a constant or slowly varying phase difference between the two signals, resulting in considerable loss of useful information at the output 4.

The means of producing the control instruction for the control generator 5 will now be described with reference to FIG. 4.

The last two storage elements (for example storage capacitors) 11 and 12 of the shift register 1 are connected to a difference stage 13, which delivers a positive output pulse when the voltage at 12 is higher than that at 11, and delivers a negative output pulse when the voltage at 11 is higher than that at 12. Similarly, the last two storage elements 21 and 22 of the shift register 2 are connected to a difference circuit 23, which also delivers a positive output pulse when the voltage at 22 is higher than that at 21, and delivers a negative output pulse when the converse occurs. When the output pulses from 13 and 23 have opposite signs, they will maintain a gate circuit 14 blocked. If, however, the output signals from 13 and 23 have the same sign, i.e., both are positive or both are negative, the gate circuit 14 conducts.

The gate 14 is connected between output 31 and 32 of the shift registers 1 and 2, respectively, and a flipflop 15, so that when 14 conducts, the voltages at 31 and 32 are applied to two inputs of the flipflop 15. As long as the sign of the voltage difference between 31 and 32 remains the same, the flipflop 15 remains in its stable state. At the instant at which this voltage difference changes sign, the flipflop 15 passes to its other stable state, and in doing so, delivers an output pulse, which via diodes 16 and 17, respectively, is applied to a line 18. For this purpose the flipflop 15 is made entirely free from hysteresis, i.e., it changes state as soon as the voltage difference at its input terminals passes through zero.

As has been set out hereinbefore, the change-over instants of the various electronic switches may be derived from the clock pulses produced appropriate frequency division. When the aforementioned principle is employed, however, these instants are less critical, and simpler means may be used. FIG. 4 shows a single clock pulse generator $f$, the output pulses from which are applied to the two poles of a double-pole switch $S_7$, $S_8$. The switch $S_7$, $S_8$ is operated simultaneously with the switch for changing the speed of a motor 20 of the tape recorder. As a simple example, a tape recorder may be considered on which all tapes are recorded at a mean speed of, for example, 9.5 cm per second, while the recordings may be played back with a retardation or acceleration by a factor of 2, for which cases the motor is switched to half-speed (4.75 cm/s) or to double speed (19 cm/s), respectively. Simultaneously with this change-over, the switch $S_7$, $S_8$ is changed over. The position shown corresponds to signal retardation; when the switch $S_7$, $S_8$ is changed over, the circuit is set to accelerated playback. The frequency divider 19 is a divider-by-two. The generator $f$ may operate at a frequency of, say, 20 kHz, so that a frequency of 10 kHz is produced at the output of 19.

These output pulses from 19 are applied to an integrating circuit 25, for example by converting each pulse into a corresponding charge current for a capacitor 26. As a result there is set up across this capacitor a sawtooth voltage which at the instant at which it exceeds a given threshold value causes a flipflop included in the control generator 5 to change state, with the result that a voltage of the nature of $S'_1$ or $S_5$ is obtainable. This control pulse is applied to the electronic switches $S'_1$ and $S_5$, but also the output pulse on the line 18 is superposed on it, so that when the combined voltages from 26 and 18 exceed a given threshold value a second flipflop included in the control device 5 changes state, which provides the leading edges of the control pulses $S''$, $S'_2$, $S''_2$, $S'_3$, $S''_3$, $S'_4$, $S''_4$ and $S_6$. At the same time this control pulse via an electronic switch $S_9$ causes the capacitor 26 to be discharged, so that it is ready for a new cycle.

Figure 4A:
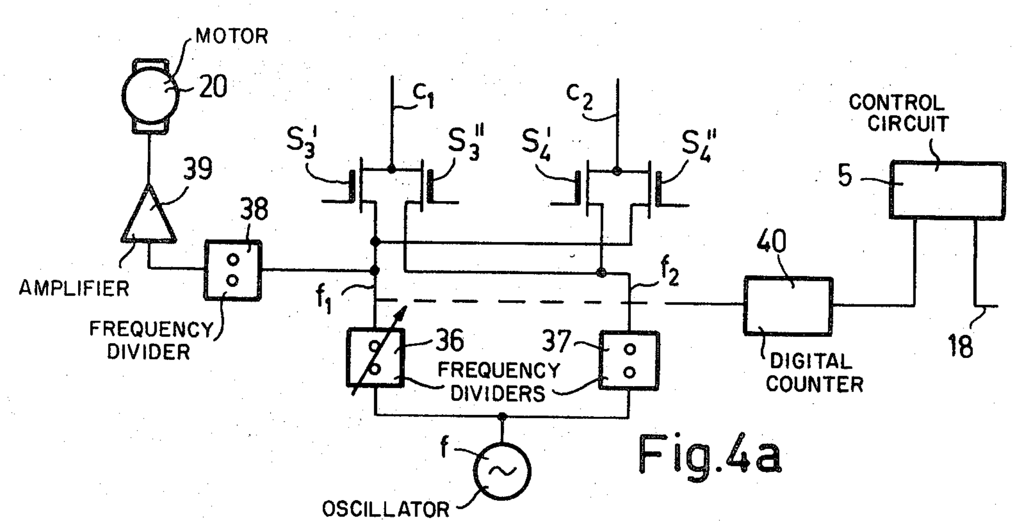

Instead of the switch $S_7$, $S_8$ and the integrating circuit 25, 26, the arrangement shown in FIG. 4*a* may be used which comprises an oscillator $f$ having a frequency of, for example, 45 kHz, which is converted in a frequency divider 36 having a variable dividing factor, into the write clock frequency $f_1$ which, for example, may be set to the values 5 kHz, 10 kHz, 22.5 kHz and 45 kHz, while a frequency divider 37 having a fixed dividing factor provides the read clock frequency $f_2$. By means of a further frequency divider 38 having a fixed dividing factor, there is derived from the write clock frequency $f_1$ a low-frequency alternating voltage which, after amplification in an amplifier 39, is fed to the (synchronous) motor 20 of the tape recorder. The lower of the two frequencies $f_1$ and $f_2$ is applied to a digital counter or a digital-to-analog converter 40, which when a given number equal to, or slightly smaller than, the number of storage elements of the shift registers in FIGS. 1 and 4, respectively, is reached, applies the initiating instruction for producing the inclined leading edges of $S'_1$ and $S_5$ (or $S''_1$ and $S_6$ respectively) to the control circuit 5. A gate for transmitting a change-over instruction pulse from the line 18 is opened on termination of the initiating instruction.

It will be appreciated that the embodiments described have only been given by way of example. If required, the integrating circuit 25, 26 may be replaced by a digital counter, which after a required number of clock pulses transmits the desired initiating instruction to the control device 5 causing the leading edges of the pulses $S'_1$ and $S_5$, and subsequently those of the other control pulses to be produced. Such a digital counter may, for example, be designed so as to pass the relevant instruction pulse to the device 5 at the 256th clock pulse. In this case, the shift registers 1 and 2 may each comprise 260 storage elements, so that after 260 clock pulses (at $c_1$ and $c_2$) an information bit has entirely been shifted from the input to the output. After 256 clock pulses the voltage $S'_1$ has fallen to about one half of its initial value, and the voltage $S_5$ has risen to about one half of its ultimate value. In other words, the switch $S'_1$ is half non-conductive, and the switch $S_5$ is half conductive. Four clock pulses later, the voltages $S'_1$ and $S_5$ have reached their final values, and an instruction pulse which occurs on the line 8 during this period or immediately afterwards, and controls the leading edges of the pulses $S''_1$ to $S''_4$, will cause a number of bits corresponding to only a few clock pulses of the information from the signal source 3, which is written into the inputs of the shift registers 1 and 2, to be lost.

What is claimed is:

1. A circuit arrangement for playing back recorded information in a tempo which differs from the original recording tempo, and particularly for playing back retarded or accelerated speech while maintaining the correct pitch, said circuit arrangement comprising:

a first shift register having an input, an output, and an auxiliary output;

a second shift register having an input, an output, and an auxiliary output;

means for supplying information in a desired tempo to said registers;

a first electronic switch disposed between said registers and said information supplying means to alternately apply said information to said registers;

a second electronic switch operated in phase opposition to said first switch, said second electronic switch connected to said registers for alternatively deriving an output signal therefrom;

means for supplying said registers with clock pulses for advancing information therethrough;

first switching means disposed between said registers and said clock pulse supplying means, for alternately, but in phase opposition, applying said clock pulses to said registers, frequencies of said clock pulses jumping from one value to another at each change-over of said switching means, a ratio of these frequencies being equal to a speed ratio between the speed at which said information is applied to the shift registers and the speed at which said information is recorded; and second switching means connected to respective registers, for connecting the respective auxiliary output of each register to the input of said respective register, said respective auxiliary outputs being partway along said registers between said inputs and said outputs such that said information at said auxiliary output is less advanced in said register than that corresponding to said respective output signal.

2. The circuit arrangement of claim 1, wherein a selector switch is connected to said second switching means so as to selectively connect the respective inputs of each register to either of its corresponding outputs.

3. The circuit arrangement of claim 1, wherein the speed at which the information is applied to said shift registers can be varied proportionally with write-in clock frequency of said registers.

4. The circuit arrangement of claim 1, wherein said auxiliary outputs are connected approximately four-tenths of the way along said registers from said inputs to said outputs.

5. A circuit arrangement for playing back recorded information in a tempo which differs from the original recording tempo, and particularly for playing back retarded or accelerated speech while maintaining the correct pitch, said circuit arrangement comprising:

a first shift register;

a second shift register;

means for supplying information in a desired tempo to said registers;

a first electronic switch disposed between said registers and said information supplying means to alternately apply said information to said registers;

a second electronic switch operated in phase opposition to said first switch, said second electronic switch connected to said registers for alternatively deriving an output signal therefrom;

means for supplying said registers with clock pulses for advancing information therethrough;

first switching means disposed between said registers and said clock pulse supplying means, for alternately, but in phase opposition, applying said clock pulses to said registers, frequencies of said clock pulses jumping from one value to another at each change-over of said switching means, a ratio of these frequencies being equal to a speed ratio between the speed at which said information is applied to the shift registers and the speed at which said information is recorded; and second switching means connected to respective registers, for connecting an output of a respective register to an input thereof, said second switching means being gradually operated, and simultaneously therewith, the first electronic switch being gradually changed over at an instant before said first switching means is changed over.

6. The circuit arrangement of claim 5, wherein the second electronic switch is gradually changed over in a time interval in which said first switching means applies clock pulses of the same frequency to each register.

7. The circuit arrangement of claim 6, comprising in addition means for determining an equality instant when the information at the output of said first and second registers is equal and varying in the same sense, and means for controlling the change-over instant of at least the second electronic switch in response to determination of said equality instant.

8. The circuit arrangement of claim 7, wherein a lower one of said clock frequency signals opens a gate for passing a change-over instruction from at least the second electronic switch as soon as said time interval is reached.

* * * * *

PO-1050
(5/69)

UNITED STATES PATENT OFFICE
CERTIFICATE OF CORRECTION

Patent No. 3,855,424 Dated December 17, 1974

Inventor(s) Poothathamby Tharmaratnam; Johannes Meijer Cluwen

It is certified that error appears in the above-identified patent and that said Letters Patent are hereby corrected as shown below:

In the heading under Foreign Application Priority Data line [30] delete"72/1920", insert --7201920--.

Column 3, line 55 delete "The", insert --This--.

Column 7, line 22 delete "stroage", insert --storage--.

Signed and sealed this 11th day of March 1975.

(SEAL)
Attest:

RUTH C. MASON
Attesting Officer

C. MARSHALL DANN
Commissioner of Patents
and Trademarks